UNITED STATES PATENT OFFICE.

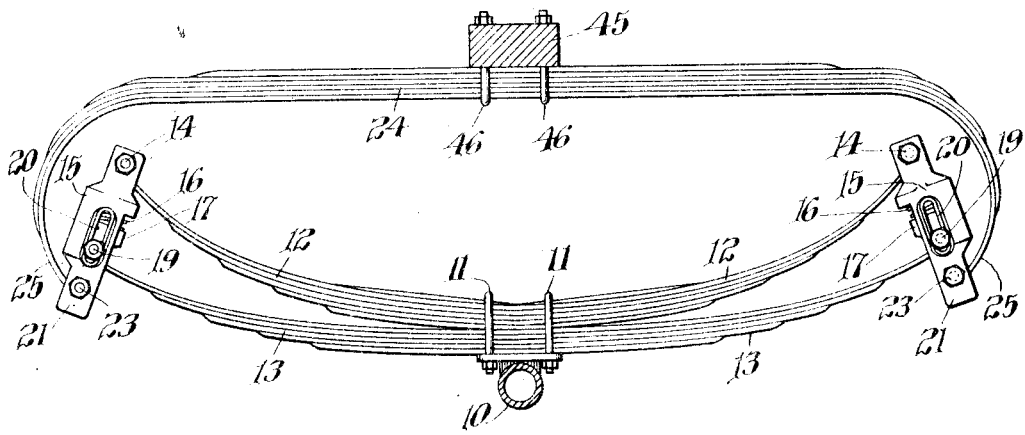
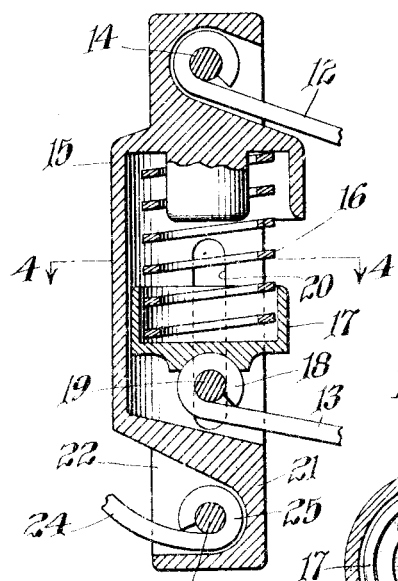
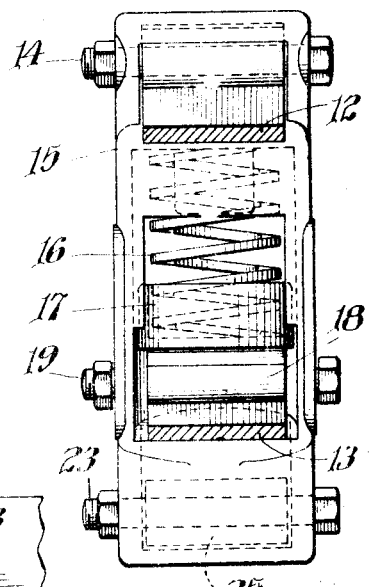
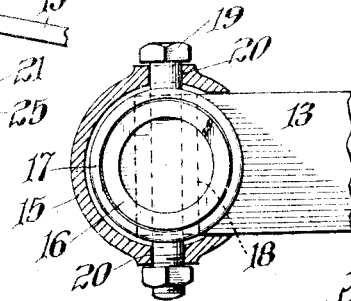

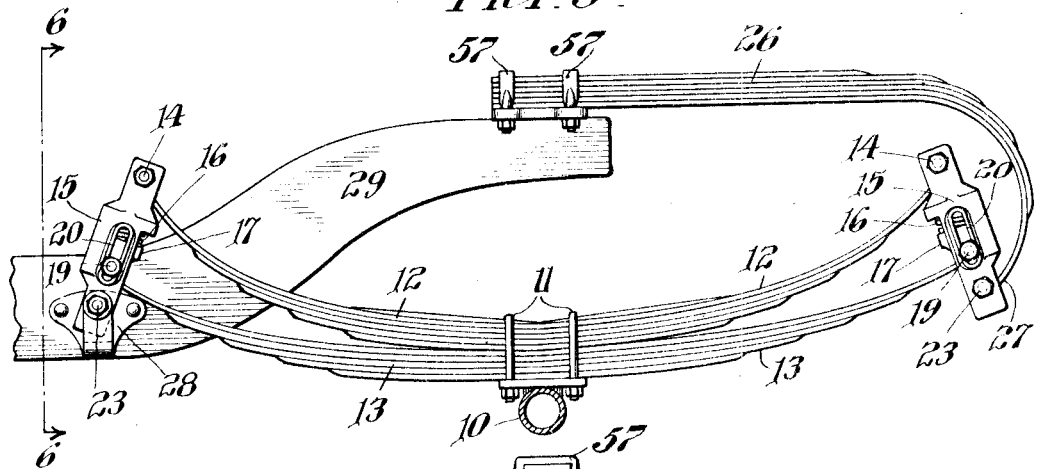
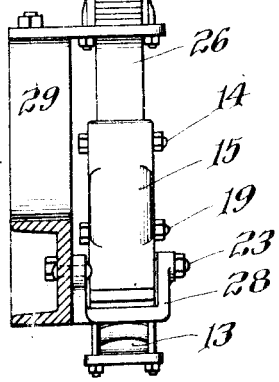
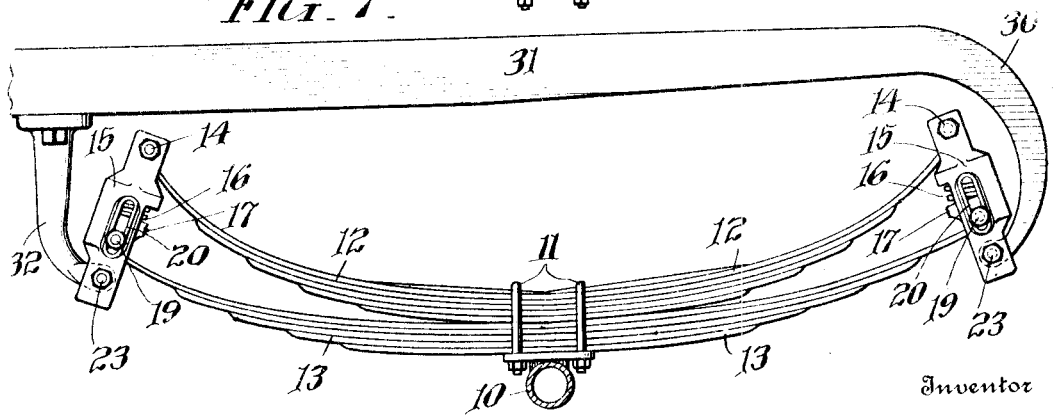

ROBERT C. MERKINS, OF PHILADELPHIA, PENNSYLVANIA.

VEHICLE-SPRING.

1,179,950.  Specification of Letters Patent.  Patented Apr. 18, 1916.

Application filed June 30, 1915. Serial No. 37,371.

*To all whom it may concern:*

Be it known that I, ROBERT C. MERKINS, a citizen of the United States, residing at Chestnut Hill, in the city and county of Philadelphia and State of Pennsylvania, have invented certain new and useful Improvements in Vehicle-Springs, of which the following is a specification.

My invention relates to vehicle springs, being particularly adaptable for use in automobiles and similar vehicles, and its principal object is to provide an improved form of spring which will effectively take up the jars incident to traveling on rough roads, and thereby eliminate the necessity for separate and additional shock absorbers, the construction and arrangement being such that the desired result is obtained whether the load carried by the vehicle be relatively light or heavy.

My invention contemplates in its preferred embodiment the employment in lieu of the usual lower half elliptic spring of two half elliptic springs one of which is pivotally connected at its ends to a shackle and the other of which is slidably connected to the shackle, compression springs being interposed between the ends of the elliptic springs and the shackle being connected to and supporting the vehicle body in any preferred manner.

The nature and characteristic features of my invention will be more readily understood from the following description taken in connection with the accompanying drawings forming part hereof, in which—

Figure 1 is a side elevation of a vehicle spring embodying the main features of my present invention, the arrangement being of the general type commonly known as the full elliptic spring. Fig. 2 is an enlarged vertical sectional view of the shackle for connecting the ends of the component lower springs to each other and to the spring or other means for supporting the vehicle body from the ends of said lower springs. Fig. 3 is a side elevation of the structure shown in Fig. 2, the spring being shown in section. Fig. 4 is a horizontal section thereof taken on the line 4—4 of Fig. 2. Fig. 5 is a view similar to Fig. 1, but showing the arrangement as applied to and embodied in the general type known as the three-quarter elliptic spring. Fig. 6 is a detail view in end elevation showing a means for attaching one of the ends of the lower spring of Fig. 5 to the frame of the car; and Fig. 7 is a view similar to Fig. 1 but showing the arrangement as applied to and embodied in the general type known as the half elliptic spring.

Referring now more particularly to Figs. 1 to 4 of the drawings, 10 is the axle or other similar part of the vehicle to which, by means of suitable fastening means such as the clip bolts 11, there are secured at their central portions a main half elliptic multiple plate spring 12 of the usual type and a similar auxiliary half elliptic multiple plate spring 13. The half elliptic plate springs 12 and 13 are separated at their free ends as clearly shown in Fig. 1 of the drawings. Each end of the main spring 12 is connected by means of a bolt 14 to a fixed point at the upper end of a shackle 15, the connection being preferably a pivotal one. The shackle 15 forms a casing or housing in which is mounted a coil compression spring 16, the upper end of which bears against the upper interior surface of the shackle 15, and the lower end of which is seated in and bears against the lower interior surface of a cup 17, which cup 17 rests upon the curled end 18 of the auxiliary spring 13. Each of the curled ends 18 of the spring 13 engages a bolt 19 which extends at each end through slots 20 in the side walls of the shackle 15 whereby each end of said spring 13 is in slidable engagement with its respective shackle 15. The shackle 15 is also provided with a lower extension 21 having a recess 22 across which extends a bolt 23 forming a means of connection of the lower part of the shackle with the vehicle through the intermediary of some other usual device, such for instance as the upper half elliptic spring 24 shown in Fig. 1, the ends of which extend around and are curled over the bolt 23 as at 25 and the central portion of which is secured to a beam 45 or other suitable part of the vehicle by means of clip bolts 46 or other common fastening means.

In Fig. 5 of the drawings there is shown another means of connection of the shackles to the vehicle at the respective ends of the springs 12 and 13, comprising at one end the quarter elliptic spring 26, the free end 27 of which is connected to the lower end of the shackle 15 in the same manner as the ends of the springs 24 are connected to the structure as shown in Fig. 1, and the other end of which spring 26 is secured to the frame 39 or other suitable portion of the vehicle by means of clip bolts 57 or other appropriate fastening means. The shackle 15 at the other end of springs 12 and 13 is pivoted by means of the bolt 23 in a bracket 28 of a common and well known form which is riveted or otherwise secured to the side frame 29 of the vehicle.

In Fig. 7 of the drawings, the shackle 15 at one end of the springs 12 and 13 is pivotally connected to the end of a goose neck extension 30 of the frame 31 of the vehicle while the shackle 15 at the other end of said springs is pivotally connected by means of the bolt 23 to the end of a depending bracket 32 as clearly shown in said Fig. 7 of the drawing.

It will be noted that the essential novel feature of the invention is the same in all three of the forms shown, namely, the provision of the two half elliptic springs joined to each other and to a portion of the vehicle at their central portions and provided with a shackle at each end to which shackles the ends of one of the springs are directly pivoted while the ends of the other spring are slidably and resiliently connected therewith.

It will be seen that when the vehicle is carrying a light load substantially all of the load will be carried through the upper spring 12 and the action will be substantially as if this spring were alone employed. When, however, the load is increased or an excessive jar occurs in the running of the vehicle, the spring 13 will be called into play, and the coil springs 16 which are mounted in the shackles 15 will be compressed to a sufficient extent to permit the spring 13 to take its proportionate share of the load and shocks. It will be found that with a structure as herein described the necessity for the provision of separate shock absorbers as are now commonly used, will be eliminated and a much better result obtained, the smooth running qualities of the vehicle being greatly improved.

Having thus described the nature and characteristic features of my invention, what I claim as new and desire to secure by Letters Patent is:

1. In a vehicle spring, the combination of two elliptic multiple plate springs secured at one portion to each other and to one portion of the vehicle, a shackle mounted at the free ends of said springs connected at a fixed point to one of said springs and slidably connected to the other of said springs, said shackle comprising a housing, a compression spring mounted in said housing, a cup mounted in said housing having one end of said compression spring seated therein and connected to the end of one of said elliptic springs, and means for connecting said shackle to another portion of the vehicle.

2. In a vehicle spring, the combination of two half elliptic multiple plate springs secured at their central portions to each other and to one portion of the vehicle, shackles pivotally connected to each of the free ends of one of said springs and slidably connected to the free ends of the other of said springs, said shackles comprising housings, compression springs interiorly mounted in said shackles and interposed between the free ends of said elliptic springs, and means for connecting said shackles to another portion of the vehicle comprising a half elliptic spring secured at its central portion to said other portion of the vehicle and having its free ends pivotally connected to said shackles.

In testimony whereof, I have hereunto signed my name.

ROBT. C. MERKINS.